Figure 1:
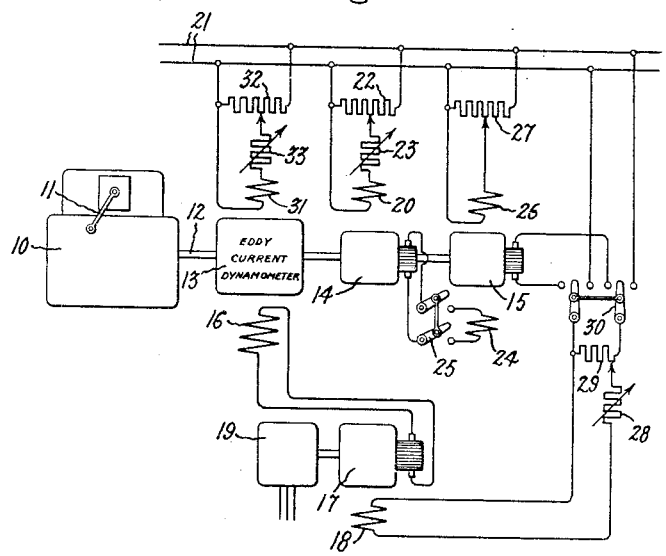

June 6, 1944.    R. H. KAUFMANN    2,350,766
DYNAMOMETER EXCITATION CONTROL SYSTEM
Original Filed Sept. 4, 1940

Inventor:
Richard H. Kaufmann,
by Harry E. Dunham
His Attorney.

Patented June 6, 1944

2,350,766

UNITED STATES PATENT OFFICE 2,350,766

DYNAMOMETER EXCITATION CONTROL SYSTEM

Richard H. Kaufmann, Schenectady, N. Y., assignor to General Electric Company, a corporation of New York Original application September 4, 1940, Serial No. 355,321. Divided and this application February 2, 1943, Serial No. 474,479

3 Claims. (Cl. 171—223)

This invention relates to an electrical dynamometer system and particularly to an electrical dynamometer system which is adapted to impose a load of certain characteristics upon a power source such as an internal combustion engine.

An object of my invention is to provide an improved dynamometer excitation control system.

Another object of my invention is to provide an excitation control system for a dynamometer employed for loading a mechanical power source whereby the actual operating characteristics of the power source may be duplicated by causing the power absorbing means to have a definite and predetermined relationship to its speed.

A further object of my invention is to provide an improved dynamometer excitation control system in which the total dynamometer excitation is functionally related to the speed and which may have components which vary as the first or second power of the speed or assume intermediate values of total excitation between these two limits.

Further objects and advantages of my invention will become apparent and my invention will be better understood from the following description referring to the accompanying drawing and the features of novelty which characterize my invention will be pointed out with particularity in the claims annexed to and forming a part of this specification.

In order to simulate in the laboratory the conditions of actual service with various types of loads, for example, propellers driven by an internal combustion engine, it is desirable to provide an excitation system for a dynamometer employed in loading the prime mover or engine which automatically will maintain with varying loads the desired power-speed relationship. In carrying out my invention in its preferred form, a pair of direct current exciter generators which are driven at a speed proportional to the dynamometer are adapted to be employed to provide a component of excitation to the dynamometer. One of these exciter generators has its armature connected to a field exciting winding of the dynamometer while its field is provided by field exciting windings connected in circuit with the armature of the other exciter generator and with an adjustable voltage source of electrical power supply. The other exciter may be excited either from an adjustable voltage source of electrical power supply or by means of a permanent magnet, the former being the preferred arrangement because of its flexibility and the ability to avoid excessive voltages. The exciter generator whose armature is connected for supplying excitation to the dynamometer field is operated preferably in the unsaturated condition. The dynamometer power absorption may be made to vary automatically over a wide range as a function of speed by adjusting the relative magnitude of the adjustable and variable components of excitation supplied to the field of the exciter generator which supplies dynamometer field excitation. Further, an additional controllable component of excitation independent of speed may be provided to the dynamometer by another field exciting winding. The response of the system can be improved and smaller machines driven by the dynamometer by connecting the dynamometer field to an electric amplifier which is controlled by the exciter generators driven by the dynamometer.

Figure 2:
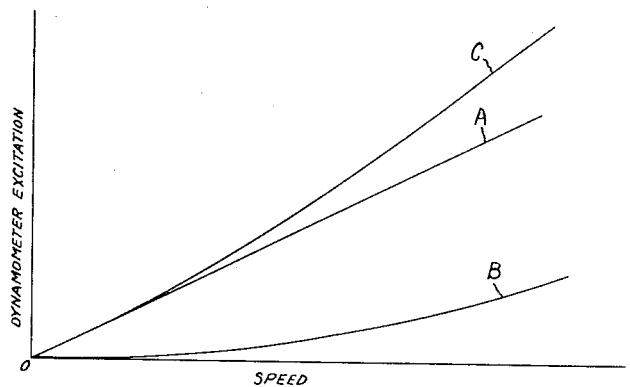

In the drawing, Fig. 1 is a schematic electric circuit diagram of apparatus arranged in accordance with my invention; and Fig. 2 illustrates several characteristic curves which will be employed in explaining my invention.

This application is a division of my copending application Serial No. 355,321, filed September 4, 1940, and assigned to the assignee of this application.

Referring to the drawing, I have shown a system for testing a prime mover 10 in the form of an internal combustion engine having a throttle 11 and mechanically connected by a shaft 12 to a rotor 13 of a dynamometer of the inductor eddy current type. Connected also to the shaft 12 or arranged to be driven at a speed proportional thereto are the rotors or armatures 14 and 15 of a pair of direct current exciter generators. The dynamometer is provided with a field exciting winding 16 which is adapted to be excited by the exciter generators through an amplifier of the dynamo-electric type comprising a conventional direct current generator which is preferably designed to operate on the straight portion of its saturation curve and which includes an armature 17 and a field exciting winding 18. The amplifier also includes a suitable constant speed motor 19 preferably of the synchronous or induction type for driving the amplifier generator armature 17. Since the direct current generator is operated in the unsaturated condition and has its armature 17 driven at a constant speed, it delivers a voltage to the dynamometer field 16 which is proportional to the excitation supplied to its field or input circuit 18. This generator may be replaced by a direct current machine of the armature-reaction excited type, such, for example, as that disclosed and claimed in Patent No. 2,227,992, E. F. W. Alexanderson and M. A. Edwards, January 7, 1941, assigned to the assignee of this application. Furthermore, an electronic amplifier may be employed in lieu of the dynamo-electric type, if desired.

The pilot exciters driven by the dynamometer may or may not be cradled with the dynamometer depending upon the required size thereof. When these pilot exciters are of such small size in comparison to the size of the dynamometer that the torque required to drive them is negligible these units need not be cradled. Hence, by the employment of an amplifier for the output of exciter generator armature 15, small pilot exciter generators may be used and thereby avoid the expense and inconvenience of mounting the exciter generators in a manner to ascertain their load requirements.

The excitation system includes a field exciting winding 20 for the pilot exciter generator armature 14 arranged to be energized by a constant voltage source of electrical power supply 21 by connecting the field exciting winding 20 across a potentiometer 22 and in series with a control or variable resistor 23. This results in the generation of a voltage by the exciter armature 14 which is substantially proportional to the speed of the dynamometer 13. This first power speed voltage is adapted to energize a field exciting winding 24 by closing a switch 25 to excite the pilot exciter armature 15. This pilot exciter also is provided with a field exciting winding 26 arranged to be energized by the constant voltage source of electrical power supply 21 by connecting it across a potentiometer 27 connected to the source of power 21. When the switch 25 is open and the field exciting winding 24 de-energized, the pilot exciter generator armature 15 generates a voltage directly proportional to its speed due to the excitation of the field exciting winding 26. When the switch 25 is closed, the armature 15 generates a voltage proportional to the square of its speed due to the excitation of the field exciting winding 24. The field exciting winding 24 and 26 are both adapted to produce magnetic fluxes in the same relative directions. The amplifier exciter field exciting winding 18 is connected in series with a vernier control rheostat 28 and across a potentiometer 29 connected to a switch 30 arranged to connect the potentiometer 29 across either the source cf supply 21 or the pilot exciter generator armature 15.

The dynamometer field producing means comprises an auxiliary field exciting winding 31 in addition to the winding 16. These windings are connected to produce magnetic fluxes in the dynamometer which are in the same relative direction. The field winding 31 is connected to the constant voltage source 21 through a potentiometer 32 and a vernier rheostat 33 for supplying a controllable constant component of excitation when the dynamometer excitation is being obtained from two independent voltage sources.

In order more fully to explain the operation and manner of adjustment of the system, Fig. 2 has been presented to show typical curves of the excitation supplied to the dynamometer field winding 16 obtained with my improved excitation system. These curves have been drawn to show the general relationships obtainable between the dynamometer excitation and the speed. The curve OA represents the dynamometer excitation characteristic which is obtained by the use of only the constant voltage component of excitation supplied to the pilot exciter field exciting winding 26. For such a condition of operation the excitation of the dynamometer is caused to vary linearly with the speed thereby producing a corresponding change in the dynamometer torque. The rate of rise of excitation with speed may be controlled by the potentiometer 27. The curve OB represents the type of excitation characteristic obtainable without any fixed component of excitation applied to the field of this pilot exciter. This may be accomplished by adjusting the variable potentiometer 27 so that the voltage obtained from the source of supply 21 is zero. In this case the dynamometer excitation is varied in accordance with the square of the speed to produce corresponding changes in the dynamometer torque. The characteristic OC represents the combined excitation characteristic obtainable when both of the excitation sources including the field windings 24 and 26 are in operation. It is clear that, with the field adjusting elements of the pilot exciters set to a given position, the magnitude of the energizing current supplied to the dynamometer field exciting winding 16 may be adjusted by means of the rheostats 28 and 29. By proper adjustment of the exciter generator field control elements, the relative magnitudes or proportions of the two excitation components supplied to the dynamometer for a given speed or speeds may be altered as desired to impose horsepower loads on the engine which vary automatically as a function of speed in the desired manner. For example, by varying the potentiometer 22 to reduce the voltage applied to the field exciting winding 20 the rate of rise or the magnitude of the voltage component for exciting the dynamometer field which varies as the square of the speed is correspondingly varied.

In describing the operation of the arrangement, the switch 30 was assumed to be thrown to the left to connect the dynamometer field exciting winding 16 with the pilot exciter generator armature 15 through the amplifier 17 and 18 for automatic operation. At times it may be desirable to use manual control and eliminate the effect of the automatic excitation completely, that is, to secure excitation for the dynamometer which is independent of speed changes. For such operation the switch 30 is thrown to the right to connect the input field circuit 18 of the amplifier to the constant voltage direct current source of supply 21, and in this way the system operates with conventional constant excitation which can be adjusted by the potentiometer 29 and vernier 28 to obtain the desired load. All or a portion of this constant excitation may also be provided by means of the dynamometer field exciting winding 31.

When it is desired to operate the system by supplying a constant component of excitation to the dynamometer in conjunction with the component or components which are functionally related to the speed, the switch 30 is thrown to the left and the constant component of excitation is supplied to the field exciting winding 31 through the rheostat 32 in such a manner that both voltages cause magnetic fluxes to be produced in the dynamometer in the same relative direction. This connection also serves the additional purpose of permitting maximum excitation at any speed down to zero on the dynamometer thereby permitting maximum available torque to be obtained on the dynamometer even at low speeds.

I have thus provided an improved excitation system which is capable of delivering a voltage which is independent of speed for exciting the dynamometer field. I have also provided an arrangement whereby the dynamometer excitation may be varied directly as the speed thereby producing a modified shape in the horsepower-speed characteristic of the dynamometer. Further, I may obtain a dynamometer excitation characteristic which is approximately proportional to the square of the speed in order to produce a change in the horsepower-speed characteristic such that the horsepower absorption increases at a faster rate with respect to speed. Also by combining in additive relation the excitation component for the pilot exciter armature 15 which is independent of the speed with the component of excitation which varies with the speed, the total excitation supplied to the dynamometer may be made automatically to vary in accordance with the first power of the speed and over a range including the second power with the result that the horsepower absorption of the dynamometer as a function of speed may be made to assume intermediate values.

I have also provided means whereby a constant component of excitation may be supplied simultaneously to the dynamometer with the component or components which are functionally related to the speed. This latter arrangement contributes toward still greater flexibility in the operation from the standpoint of making it possible to produce additional changes in the shape or slope of the total dynamometer excitation characteristic. It also renders it possible to obtain maximum excitation on the dynamometer at low speeds with relatively small exciters, and at the same time is effective to provide a stabilizing action to prevent hunting or overspeeding by producing a pronounced increase in the dynamometer torque with increases in speed in those cases where the dynamometer would have a flat or nearly uniform speed-torque characteristic over a large part of its speed range if the excitation were held at a constant value.

The apparatus is thus adapted for producing in the laboratory various torque-speed and horsepower-speed relationships for simulating different types of loads so that operating characteristics similar to that found in actual practice from the standpoint of stability and control may be obtained. The apparatus is particularly useful in those cases where the excitation and torque of the dynamometer are not related in a simple manner. In other words, in order to obtain an absorption torque, for example, which varies as the square of the speed, it may be necessary to increase the field excitation at a different rate. Also, due to differences in various machine designs, this rate or the relative curvature of the total required dynamometer excitation curve changes for different machines. This difference in excitation rate is readily obtainable by changing the proportions or relative magnitudes of the various excitation components.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electrical testing system including an electric dynamometer for loading the prime mover to be tested, said dynamometer having first and second field exciting windings for controlling the speed-torque characteristics thereof, a first exciter generator having a field exciting winding and an armature member adapted to be driven at a speed proportional to the speed of said dynamometer, means for energizing said first field exciting winding of said dynamometer in accordance with the voltage variations in the armature of said first exciter generator, a second exciter generator having field producing means and an armature adapted to be driven at a speed proportional to the speed of said dynamometer, a substantially constant voltage source of electrical power supply, means for connecting said field exciting winding of said first exciter generator for energization thereof in accordance with the voltage variations in said armature of said second exciter generator and for providing excitation in the same direction as said first field exciting winding of said first exciter, and means for energizing said second field exciting winding of said dynamometer from said constant voltage source of electrical power supply for providing excitation in the same direction as said dynamometer first field exciting winding.

2. A prime mover electrical testing system including an electric dynamometer for loading the prime mover to be tested, said dynamometer having first and second field exciting windings for controlling the speed-torque characteristics thereof, a first exciter generator having first and second field exciting windings and an armature member adapted to be driven at a speed proportional to the speed of said dynamometer, means including an amplifier for energizing said first field exciting winding of said dynamometer in accordance with the voltage variations in the armature of said first exciter generator, a second exciter generator having field producing means and an armature adapted to be driven at a speed proportional to the speed of said dynamometer, a substantially constant voltage source of electrical power supply, means for connecting said first field exciting winding of said first exciter generator for energization from said constant voltage source of electrical power supply, means for connecting said second field exciting winding of said first exciter generator for energization thereof in accordance with the voltage variations in said armature of said second exciter generator and for providing excitation in the same direction as said first field exciting winding of said first exciter, and means for energizing said second field exciting winding of said dynamometer from said constant voltage source of electrical power supply for providing excitation in the same direction as said dynamometer first field exciting winding.

3. In combination in a device for testing prime movers, an electric dynamometer for loading the prime mover to be tested, said dynamometer having first and second field exciting windings for controlling the speed-torque characteristics thereof, a first exciter generator having first and second field exciting windings and an armature member arranged to be driven at a speed proportional to the speed of said dynamometer, means for energizing said first field exciting winding of said dynamometer in accordance with the voltage variations in said armature of said first exciter generator, a second exciter generator having a substantially constant field producing means and an armature arranged to be driven at a speed proportional to the speed of said dynamometer, a substantially constant voltage source of electrical power supply, means for connecting said first field exciting winding of said first exciter generator for energization from said constant voltage source of electrical power supply, means for connecting said second field exciting winding of said first exciter generator for energization thereof in accordance with the voltage variations in said armature of said second exciter generator and for providing excitation in the same direction as said first field exciting winding of said first exciter, and means for energizing said second field exciting winding of said dynamometer from said constant voltage source of electrical power supply.

RICHARD H. KAUFMANN.